Patented May 3, 1927.

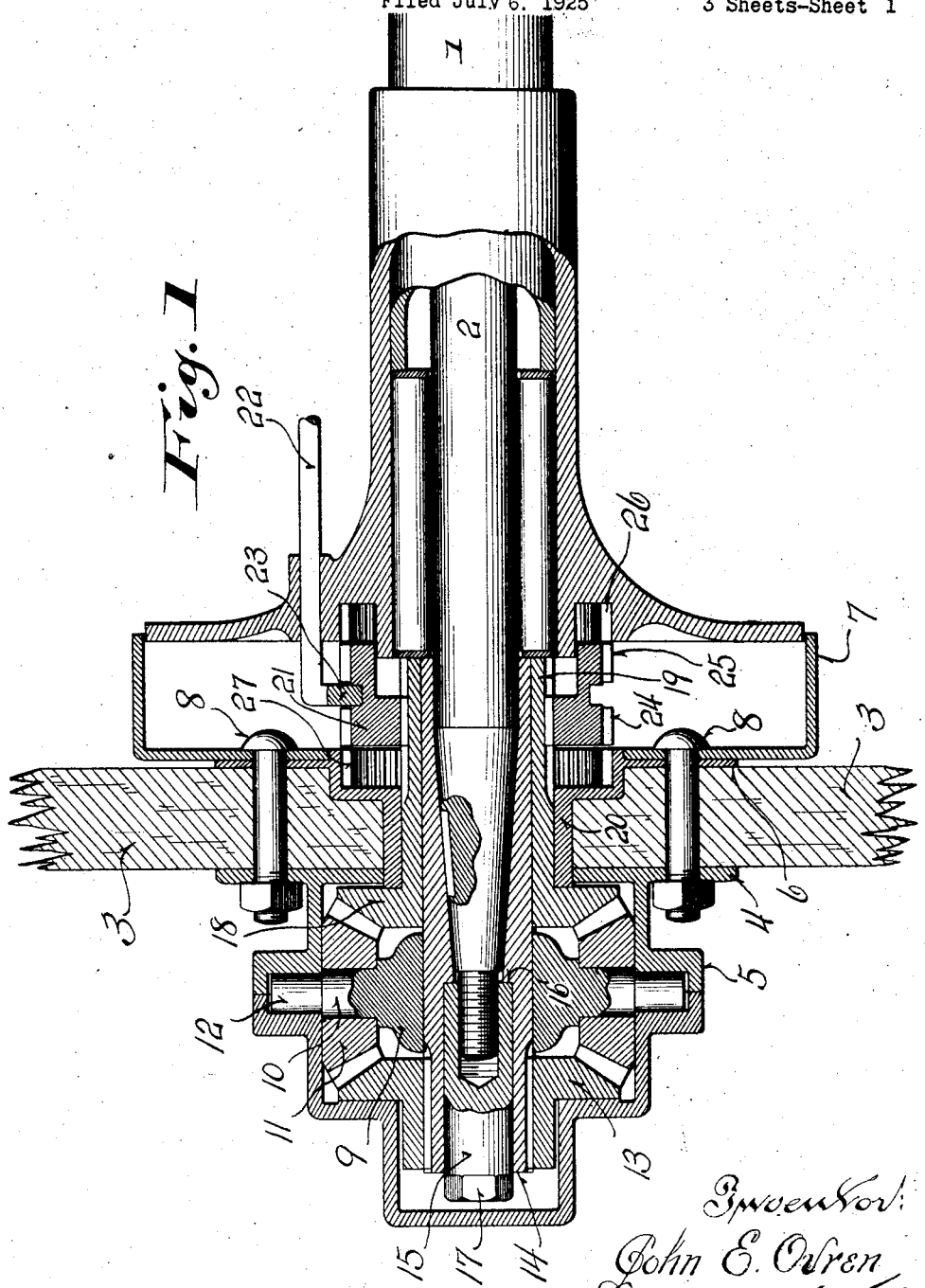

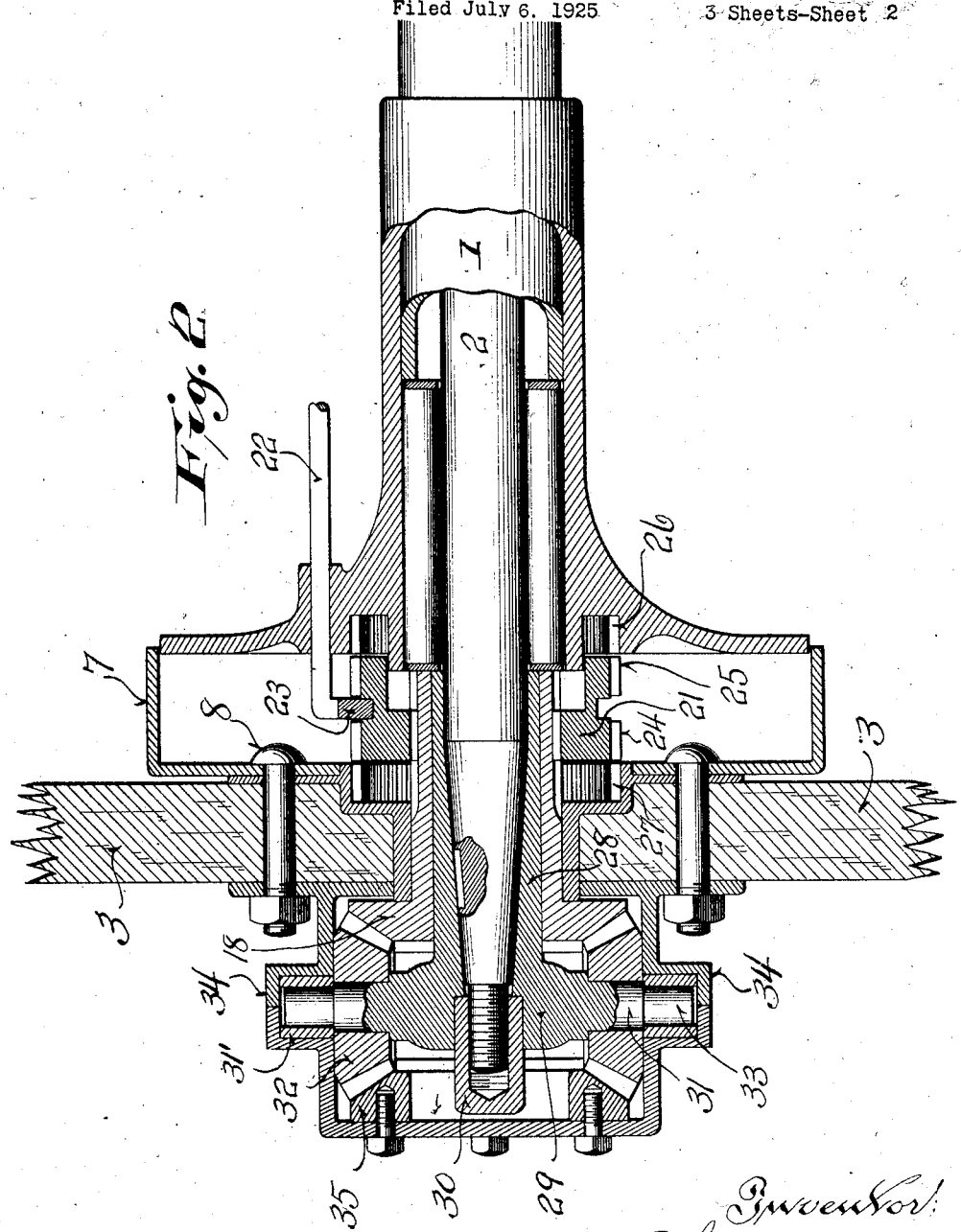

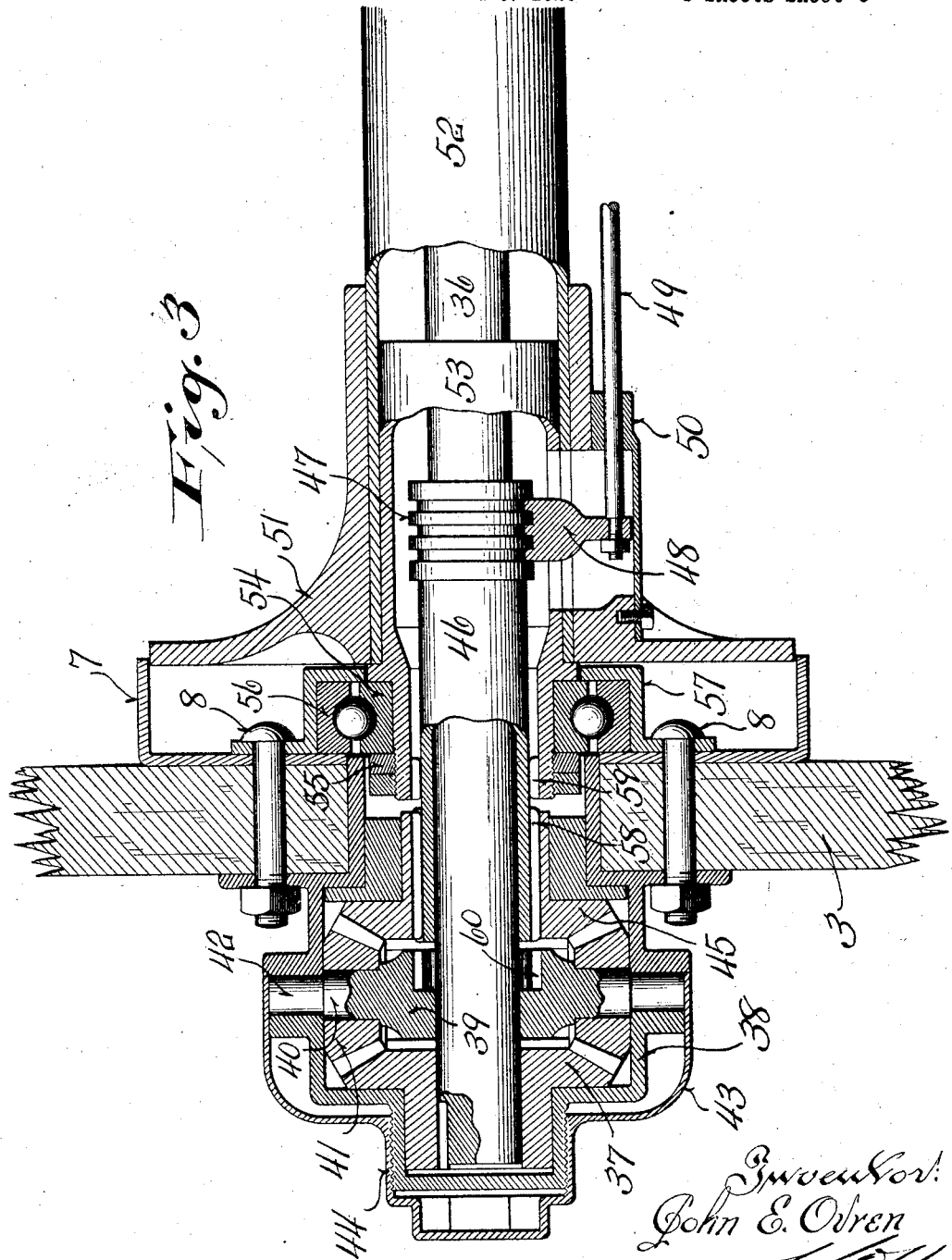

1,627,196

UNITED STATES PATENT OFFICE.

JOHN E. OVREN, OF STOUGHTON, WISCONSIN, ASSIGNOR OF ONE-HALF TO BENJAMIN J. LOGAN, OF STOUGHTON, WISCONSIN.

TRANSMISSION MECHANISM.

Application filed July 6, 1925. Serial No. 41,760.

This invention relates to transmission mechanism.

Objects of this invention are to provide transmission mechanism which utilizes change speed gearing of a novel and effective type which may be applied to existing types of automobiles with a minimum of change, and which will yet extend the range of speed of the machine without requiring any alteration whatsover in the standard transmission of the automobile.

Further objects are to provide a transmission mechanism which may be applied to the driving shafts or rear axles of a standard automobile, and which is adapted to be applied adjacent the rear or driving wheels of an automobile, and which requires only a slight increase in space, such increase being provided on the outer side of the wheel.

Further objects are to provide a transmission mechanism which is completely housed and is self-contained, and has the appearance of a slightly larger hub cap than the standard cap without requiring, however, a great amount of room, and which does not detract from the appearance of the machine to which it is applied.

Embodiments of the invention are shown in the accompanying drawings, in which:—

Figure 1 is a sectional view through a driving wheel and the rear axle showing the device in position, such view showing the device applied to a standard rear axle construction.

Figure 2 is a similar view of a modified form in which a different variation of speed is attained.

Figure 3 is a view of a further form in which the standard axle is replaced by an axle especially made for this device.

While the invention has been shown as applied primarily to automobiles, it is apparent that this transmission gearing may be employed in other capacities without departing from the spirit of the invention.

Figure 1, showing one form of the invention will first be described. Referring to this figure, it will be seen that the standard rear axle housing 1 is employed together with the standard shaft 2.

The wheel 3 is bolted between a flange 4 of an outwardly projecting casing 5 and an inner flange 6 of an inner casing.

Further, it is to be noted that the ordinary brake drums 7 are secured in place by the same bolts 8, which retain the flanges, previously described, in binding engagement with the wheel 3.

If desired, the casing 5 may be made in two parts, as shown in Figure 1, such parts being held together in any suitable manner. The casing 5 carries a spider 9 which is provided with a plurality of regularly spaced stub shafts 10 upon which bevel gears 11 freely rotate. These stub shafts are provided with outwardly projecting integral continuations 12 which fit in corresponding sockets in the casing 5, as shown in Figure 1. These bevel gears 11 mesh with a bevel gear 13 which is splined to an extension 14. The extension 14 is splined to the rear axle 2 and is provided with a tapered portion adapted to wedge upon the tapered end of such rear axle.

A plug 15 is apertured and internally threaded to engage the threaded end of the shaft 2 and it is to be noted that the inner end of this plug engages a shouldered portion 16 of the extension 14. Preferably, the plug is provided with a hexagonal or other shaped end 17 adapted to be operated by a wrench in order to lock the extension 14 rigidly to the shaft 2.

From the description thus far given, it will be seen that the gear 13 rotates with the shaft 2 under all conditions.

A bevel gear 18 also meshes with the bevel pinions 11, as indicated, and is revolubly mounted upon the extension 14, such bevel gear being provided with an elongated hub 19. It is to be noted from Figure 1 that this hub is revolubly mounted within a shell 20 formed integrally with the flange 6 previously described.

The rear portion of the hub 19 is splined to a locking member 21 which freely slides upon such hub and is controlled by means of a rod 22, such rod having a ring-like section 23 fitted within a groove in the member 21. The member 21 is provided with teeth 24 and 25. The teeth 25 are adapted to engage teeth 26 formed in a socketed portion of the outer end of the rear axle housing and the teeth 24 are adapted to engage teeth 27 formed in a socketed portion of the ring-like member 20 which is rigid with the wheel 3.

In operation the device functions as follows:—When the parts are in the position shown in Figure 1 the transmission mechanism is in neutral position. Rotation of the shaft 2 is not transmitted to the wheel 3 for the bevel gear 13 drives the bevel pinions 11 which in turn drive the freely rotatable bevel gear 18 and thus no power is transmitted to the wheel 3. However, when the rod 22 is drawn inwardly, the teeth 25 and 26 lock and the gear 18 is held stationary. Thus when the shaft 2 rotates, the bevel pinions 11 are caused to walk around the bevel gear 18 and the wheel is rotated at half the speed of rotation of the shaft 2. Thereafter, the shift rod 22 may be slid outwardly, thus causing interlocking to occur between the teeth 24 and 27. This locks the bevel gear 18 rigidly to the wheel and the bevel gears 18, 11 and 13 rotate as a unit and cause a direct connection between the wheel 3 and the shaft 2.

In this form of the invention, the transmission mechanism allows the shaft to drive the wheel at half speed or at full speed by a simple shifting motion of the shift lever 22.

Figure 2, showing a further form of the invention, will now be described. In this form the standard drive shaft 2 and rear axle housing 1 are employed as in the form previously described, and a member 21 corresponding to the similarly numbered member 21 in Figure 1, is employed and provided with teeth 24 and 25. These teeth are adapted to engage teeth 27 and 26, as in the previously described form of the invention. Similarly, a shift rod 22 is employed to operate the member 21. In this construction the gear 18 is also employed and normally freely rotates upon the hub 28 of a spider 29, such hub being rigidly locked to the drive shaft 2 in a manner similar to that previously described, by means of a cap or nut 30. The spider carries a plurality of short stub shafts 31 upon which bevel pinions 32 freely rotate. These stub shafts are provided with integral extensions 33 which fit within corresponding sockets formed in a ring 31' slidably carried within the casing 34, such casing being rigidly bolted to the wheel 3. A bevel gear of ring-like construction, as indicated at 35, is rigidly bolted to the casing 34.

This form of the invention may be operated, as described herewith. For instance, when neutral position is desired, the parts are left in their relative positions, as shown in Figure 2, and rotation of the shaft 2 merely causes the spider 29 to rotate the bevel pinions 32 about the bevel gear 35, the bevel gear 18 freely turning without transmitting power to the wheel 3. When, however, the shift rod 22 is moved outwardly the teeth 24 and 27 interlock and the bevel gears 18, 32, and 35, together with the wheel 3, rotate as a unit and consequently the wheel is driven at the same speed as the shaft 2. When the shift rod 22 is drawn inwardly, the teeth 25 and 26 interlock and the member 21 is consequently held stationary, thus holding the gear 18. When the shaft 2 is rotated the bevel pinions 32 travel around the bevel gear 18 and consequently rotate the bevel gear 35 at twice the speed of rotation of the shaft 2, thus driving the wheel 3 at double speed. These devices shown in Figures 1 and 2, are adapted to be applied to the standard equipment of automobiles without requiring any substitution of rear axle drive shafts.

In the form shown in Figure 3, a special drive shaft 36 is employed. This drive shaft passes outwardly almost to the extreme end of the device, as shown in Figure 3 of the drawings. A bevel gear 37 is rigidly keyed to the outer end of the drive shaft and is provided with a hub which freely rotates with a bearing formed in the casing 38, such casing being rigidly secured to the wheel 3. A spider 39 is mounted for free rotation upon the shaft 36 and is provided with a plurality of stub shafts 40 upon which bevel pinions 41 freely rotate. These stub shafts are provided with integral outwardly projecting extensions 42 fitted within corresponding sockets in the extensions 38. If desired, a closure cap 43 may lap over the outer ends of the projection 42, such closure cap being threaded to the casing 38, as indicated at 44. A bevel gear 45 meshes with the bevel pinions 41 and is splined to a slidable sleeve 46 mounted upon the shaft 36. This sleeve is preferably provided with a plurality of collar-like ribs 47 which are engaged by fingers formed in a shift member 48 carried by a shift rod 49. A convenient way of carrying this shift rod is by means of a bearing 50 formed in an auxiliary member bolted to the flanged end 51 of the rear wheel housing 52. In this form of the invention, an internal sleeve 53 is positioned within the rear axle housing 52 and is provided with a shouldered portion which carries the inner raceway 54 of a ball bearing, such inner raceway being held in place by means of nuts 55 screwed upon the threaded projecting end of the sleeve 53. The outer raceway 56 of the ball bearing is carried within a channel formed in an auxiliary ring 57 bolted to the wheel 3.

In operation the parts may be left in neutral position, as shown in Figure 3, and in this case the rotation of the shaft 36 does not rotate the wheel 3 but merely rotates the bevel gear 37, the bevel pinions 41, the bevel gear 45 freely rotating the sleeve 46 to which it is loosely splined.

When the shift rod 49 is drawn inwardly, the splined portion of the sleeve 46 rigidly connects the bevel gear 45 and the stationary sleeve 53 by causing engagement to occur between the elongated teeth 58 of the sleeve 46 and the teeth 59 of the sleeve 53. Thus the gear 45 is held stationary and the bevel pinions 49 are caused to walk around the bevel gear 45, thus rotating the wheel 3 at half speed.

When, however, the shift lever 49 is moved outwardly, the elongated teeth 58 of the sleeve 46 are caused to engage the teeth 60 of the spider 39 thus rigidly locking the bevel gear 45 and the bevel pinions 41 together. In effect, this locks all of the bevel gears together and causes the wheel to rotate at the same speed as the shaft 36.

It will be seen that a transmission mechanism has been provided which may be applied to the driving wheels of automobiles without requiring any change whatsoever in the main differential of the automobile or in the transmission mechanism thereof, such as is found on standard automobiles.

It will be seen further that this transmission mechanism is extremely compact and is assembled adjacent the driving wheels of the automobile in a manner which is not unsightly and which does not occupy an excessive amount of room, but which, when fully assembled, simulates very closely the appearance of the ordinary hub cap.

It will be seen further that this transmission mechanism extends greatly the range of speed of the automobile in a very simple and efficient manner.

Although the invention has been described in considerable detail, it is to be understood that the invention may be variously embodied and is, therefore, to be limited only as claimed.

I claim:

1. The combination of a rotary shaft, a stationary housing surrounding said shaft, a wheel mounted coaxially with said shaft and beyond said housing, a casing rigidly bolted to said wheel, a sleeve keyed to said shaft and projecting therefrom, a spider revolubly mounted upon said sleeve and having projecting pins anchored in said casing and having intermediate bearing portions, a plurality of bevel pinions carried upon said bearing portions, a bevel gear keyed to the outer end of said sleeve and meshing with said bevel pinions, a second bevel gear revolubly mounted upon said sleeve and meshing with said bevel pinions, and means for locking said second bevel gear either to said wheel or to said stationary housing.

2. In an automobile, having a drive shaft provided with a conical end and having a keyway therein and having a stationary housing surrounding said shaft, the combination of a sleeve fitting over the end of said shaft and having a conical bore conforming to the conical end of said shaft, said sleeve being keyed to said shaft, a wheel mounted coaxially with said shaft, a casing rigidly carried by said wheel and having a hollow bearing at its outer end, a bevel gear keyed to said sleeve and fitting within and carried by said hollow bearing, a spider revolubly mounted upon said sleeve and having projecting pins anchored in said casing and having intermediate bearing portions, a second bevel gear mounted adjacent said wheel and revolubly carried by said sleeve, a plurality of bevel pinions mounted upon the intermediate bearing portions of said spider and meshing with said bevel gears, said second mentioned bevel gear having an elongated hub provided with a keyway, a slidable member carried by said hub and having a tongue fitting within said keyway, means for shifting said slidable member, said slidable member and said wheel and housing having interengaging means, whereby said slidable member may be locked either directly to said wheel or directly to said stationary housing.

In testimony that I claim the foregoing I have hereunto set my hand at Milwaukee, in the county of Milwaukee and State of Wisconsin.

JOHN E. OVREN.